United States Patent
Stewart et al.

(10) Patent No.: US 7,519,598 B2
(45) Date of Patent: *Apr. 14, 2009

(54) PRIORITIZING NETWORK MANAGEMENT TRAFFIC

(75) Inventors: Robert L. Stewart, Wilton, NH (US); Ramanathan R. Kavasseri, Fremont, CA (US); Sandra C. Durham, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 11/378,591

(22) Filed: Mar. 17, 2006

(65) Prior Publication Data
US 2006/0161519 A1  Jul. 20, 2006

Related U.S. Application Data

(63) Continuation of application No. 09/317,746, filed on May 24, 1999, now Pat. No. 7,047,292.

(51) Int. Cl.
*G06F 17/30* (2006.01)
(52) U.S. Cl. .................. 707/9; 707/2; 707/3; 707/7; 707/8; 707/10; 709/224; 709/225; 709/226
(58) Field of Classification Search .............. 707/1–10, 707/100–104.1; 709/223–226
See application file for complete search history.

(56) References Cited

U.S. PATENT DOCUMENTS

| | | | | |
|---|---|---|---|---|
| 5,448,731 A | * | 9/1995 | Wang et al. ................. | 718/103 |
| 5,617,541 A | | 4/1997 | Albanese et al. | |
| 5,623,603 A | | 4/1997 | Jiang et al. | |
| 5,689,642 A | | 11/1997 | Harkins et al. | |
| 5,717,604 A | | 2/1998 | Wiggins | |
| 5,748,190 A | | 5/1998 | Kjorsvik | |
| 5,802,146 A | | 9/1998 | Dulman | |
| 5,870,558 A | | 2/1999 | Branton et al. | |
| 5,999,978 A | | 12/1999 | Angal et al. | |

(Continued)

FOREIGN PATENT DOCUMENTS

JP  10-040044  2/1998

OTHER PUBLICATIONS

Network Working Group, "A Simple Network Management Protocol (SNMP)," [online] May 1990 [retrieved Sep. 20, 2004] Retrieved from the Internet <URL:http://www.ietf.org/rfc/rfc1157.txt?number=1157>.

*Primary Examiner*—Isaac M Woo
(74) *Attorney, Agent, or Firm*—Hamilton, Brook, Smith & Reynolds, P.C.

(57) ABSTRACT

In a computer network, network management applications in a network management station manage and control managed elements connected to the network through the use of network management requests. The network management requests are prioritized by the management station or the managed element. The managed element prioritizes received requests by pre-assigning priority values corresponding to user identification values included in the request or by pre-assigning priority values corresponding to source identification values included in the request. The management station prioritizes the network management requests by adding a priority value to each network management requests before sending the request to the managed element. The managed element extracts the priority value directly from the request or dependent on the user identification or source identification included in the request.

14 Claims, 7 Drawing Sheets

U.S. PATENT DOCUMENTS

| | | |
|---|---|---|
| 6,012,095 A | 1/2000 | Thompson et al. |
| 6,032,183 A | 2/2000 | Chen et al. |
| 6,076,107 A | 6/2000 | Chen et al. |
| 6,085,238 A | 7/2000 | Yuasa et al. |
| 6,101,539 A | 8/2000 | Kennelly et al. |
| 6,119,156 A | 9/2000 | Filion et al. |
| 6,219,697 B1 | 4/2001 | Lawande et al. |
| 6,263,361 B1 | 7/2001 | Hoyer et al. |
| 6,321,266 B1 | 11/2001 | Yokomizo et al. |
| 6,333,789 B1 | 12/2001 | Shima |
| 6,434,607 B1 | 8/2002 | Haverstock et al. |

\* cited by examiner

| | 404 | 406 | 408 |
|---|---|---|---|
| 400 — | GROUP #1 | USER #1<br>USER #4 | PRIORITY LEVEL 3 |
| | GROUP #2 | USER #2<br>USER #5 | PRIORITY LEVEL 1 |
| 402 — | GROUP #3 | USER #3 | PRIORITY LEVEL 2 |

FIG. 4A

| | 410 | 412 |
|---|---|---|
| 418 — | COMMUNITY #1<br>(USER #1; USER #4) | PRIORITY LEVEL 3 |
| 420 — | COMMUNITY #2<br>(USER #2; USER #5) | PRIORITY LEVEL 1 |
| 422 — | COMMUNITY #3<br>(USER #3) | PRIORITY LEVEL 2 |

FIG. 4B

| SOURCE IDENTIFICATION #1 | PRIORITY LEVEL 2 |
|---|---|
| SOURCE IDENTIFICATION #2 | PRIORITY LEVEL 1 |

FIG. 7

PRIORITIZING NETWORK MANAGEMENT TRAFFIC

RELATED APPLICATION

This application is a continuation of U.S. application Ser. No. 09/317,746, filed May 24, 1999 now U.S. Pat. No. 7,047,292. The entire teachings of the above application are incorporated herein by reference.

BACKGROUND OF THE INVENTION

A computer network is a group of interconnected nodes communicating with one another. The interconnected nodes are devices such as, computers, routers, bridges and switches. In a computer network in which all the nodes are local, for example, in the same building, a node can be managed by physically managing and controlling the node.

However, in computer networks in which there are non-local nodes, remote managing and controlling of nodes is necessary. To provide remote management and control of nodes, a network manager is provided in one or more nodes in the computer network. The network manager includes one or more network management applications. The nodes managed and controlled by the network management applications are called managed elements.

A managed element includes managed objects. A managed object is any object for which information is stored in the managed element. For example, the managed object may be text identifying the manufacturer of the managed element or a list of all nodes connected to the managed element. The managed element stores information for the managed object in a Managed Information Base ("MIB"), and makes it available to the network manager application.

The network management application may request information for a managed object stored in the managed element's MIB, using a network management protocol to communicate the request to the managed element. Standard network management protocols, such as the Simple Network Management Protocol ("SNMP") described in the Internet Engineering Task Force ("IETF") Request For Comments ("RFC") standard Numbers 1901-1908 and 2271-2275, define a protocol for transferring information for managed objects between a network manager and a managed element.

Having retrieved the information for the managed object, the network management application may display the retrieved information on a monitor, record it for later analysis, or use it for automated management. The managed objects retrieved and displayed by a network management application may include, for example, a list of all discovered devices in the computer network, the status of any discovered devices or the number of data packets forwarded by the managed element.

A request for retrieval of one or more managed objects from a managed element is generated by the network management application in the management station. The request for retrieval of one or more managed objects requires a message to be sent from the management station to the managed element. Each time a selected managed object is to be retrieved, a new message is required. Therefore, managing a managed object in the managed element may require continuously requesting information from the managed object. For example, to manage the performance of the computer network, the network management application may have to periodically request that the managed element return the value of a counter.

The number of requests for information from managed objects in the managed element directly affects the performance of the managed element. While the managed element is providing requested information from the managed object, data transfer through the managed element is reduced.

Therefore, what is needed is a method for prioritizing requests from computer network management applications.

SUMMARY OF THE INVENTION

The present invention relates to prioritizing network management requests sent by a management station to a managed element. A priority value is assigned to the network management request and the network management request is scheduled by the managed element dependent on the assigned priority value.

The priority value may be assigned to the network management request by the managed element. The managed element assigns the priority value by adding a priority value to an authentication group, including user identification values in an authentication table or by adding a priority value to a source identification in a source identification table. The network management request is scheduled by the managed element by extracting the user or source identification values from the network management request and using the extracted identification to index the corresponding table.

The priority value may be assigned by the management station. The management station assigns a priority value to each network management request before sending the network management request to the managed element. The priority value is extracted by the network management element and the managed element schedules the network management request dependent on the extracted priority value.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4A shows the format of Local Control Data stored in the managed element shown in FIG. 1, for a managed element implementing Simple Network Management Protocol Version 3;

FIG. 4B shows the format of Local Control Data stored in the management element shown in FIG. 1, for a managed element implemented Simple Network Management Protocol Version 1 or Version 2;

FIG. 7 shows the format of a configuration file in the managed element for prioritizing network management requests dependent on source address.

DETAILED DESCRIPTION OF THE INVENTION

Figure 1:
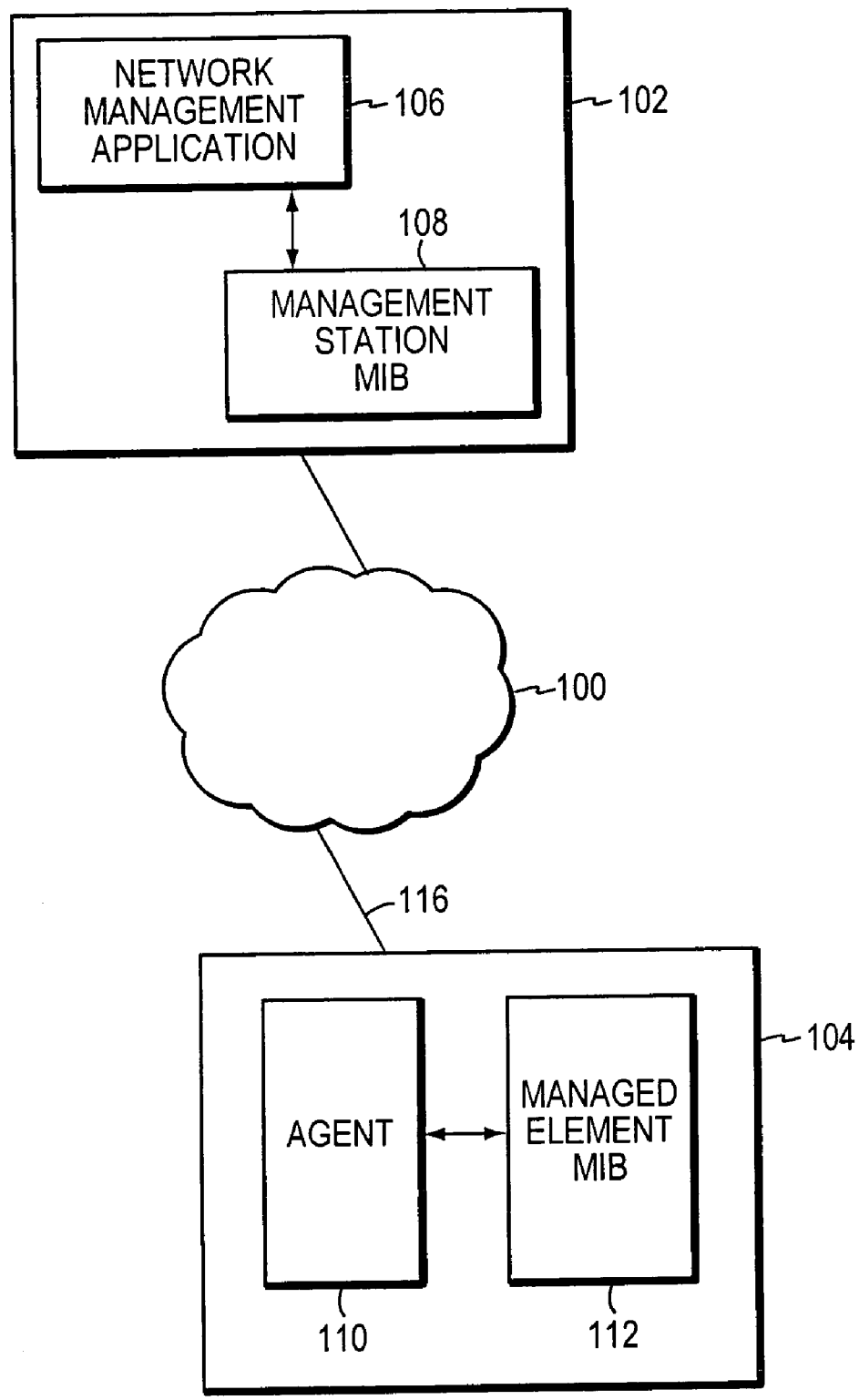
FIG. 1 shows a management station and a managed element connected to a network, network management requests from network management applications in the management station, for a managed object in the managed element, are prioritized according to the principles of the present invention.

FIG. 1 shows a management station 102 and a managed element 104 connected to a network 100. The managed element 104 may be, for example, a router, a terminal server or a switch. The management station 102 may be a computer system. The managed element 104 and management station 102 may be local or remote.

A network management protocol defines the protocol for communications between the management station 102 and the managed element 104 over the network 100. In the embodiment shown, the network management protocol used is the Simple Network Management Protocol ("SNMP") described in Internet Engineering Task Force ("IETF") Request For Comments ("RFC") 1901-1908 and 2271-2275.

Network management information is stored in managed objects in the managed element's Managed Information Base ("MIB") 112. A managed object is information stored in a predefined format in the managed element. Managed objects may be requested by the management station. For example, the managed object may be text identifying the managed element's physical network interface or text identifying the manufacturer of the managed element.

MIBs may be standard or private. In a standard MIB the definitions of the managed objects in the MIB have been approved by a standards organization, for example, the managed objects defined for the Asynchronous Transfer Mode ("ATM") in IETF RFC Number 1695. A private MIB contains either non-standard definitions for managed objects in a management element or extensions to standard definitions of managed objects.

The management station 102 includes network management applications 106 and the management station's Management Information Base ("MIB") 108. The management applications 106 manage and control managed objects (not shown) stored in the managed element's MIB 112. The management station 102 observes or controls managed objects in the managed element 104 by sending a SNMP message 300 to read or write the information.

The managed element 104 includes the managed element's MIB 112 and an agent 110. The agent 110 is a processing entity to which a SNMP message 300 from the management station 102 is sent. The agent 110 interprets the contents of the SNMP message 300, performs the operation requested in the contents of the SNMP message 300 and returns a SNMP message 300 to the management station 102. The agent 110, dependent on the contents of the SNMP message, either extracts the requested information from the managed object or modifies the managed object stored in the managed element's MIB 112. If the information is to be returned to the network management application 106, the agent 110 sends an SNMP message 300 containing the requested information over the network 100 to the management station 102.

The management station 102 and the managed element 104 include software instructions stored in bits in memory (not shown). The software instructions are grouped into software routines. The software routines perform operations in the management station 102 and the managed element 104.

Figure 2:
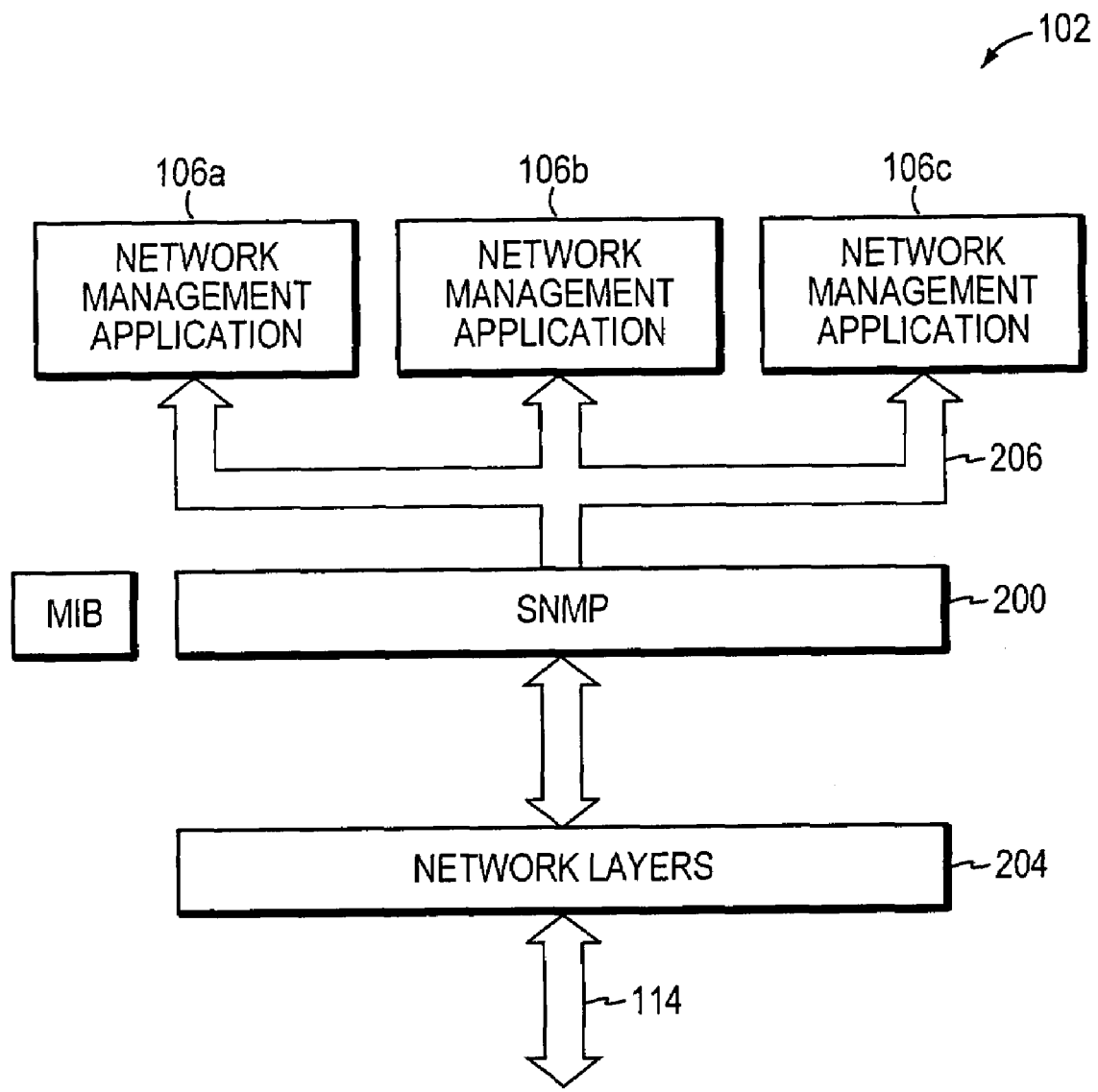
FIG. 2 shows a method for issuing a network management request from a network management application in the management station shown in FIG. 1 using the Simple Network Management Protocol.

As shown in FIG. 2, the management station 102 includes a number of network management applications 106a-c. Any of the network management applications 106a-c may request information from any managed object stored in the managed element's MIB 112 (FIG. 1). The request for information from the managed object is sent to the SNMP interface 200.

The SNMP interface 200 creates an SNMP message 300 requesting information from the managed object. The format of the SNMP message 300 is described in conjunction with FIG. 3. The SNMP message 300 includes a request for information from the managed object.

Having created the SNMP message 300 the SNMP interface 200 forwards the SNMP message 300 to the network layers 204. As is well known in the art, before sending the SNMP message 300 over the network the SNMP message 300 is forwarded to a transport layer, such as User Datagram Protocol ("UDP"). The transport layer processes the SNMP message 300 into UDP packets and forwards the packets to the network layer.

The network layer includes the IP protocol. The IP protocol adds an IP address for the destination node to each packet. The size of the IP address added is dependent on the version of the IP protocol used. Version 4 of the IP protocol ("IPv4") adds a 32 bit IP address to each packet. Version 6 of the IP protocol ("IPv6"), adds a 128 bit IP address to each packet. The network layer forwards the packets including IP addresses to the Link layer. The Link layer sends the packets including the IP addresses, over the physical medium through the management station's network physical interface 114.

Figure 3:
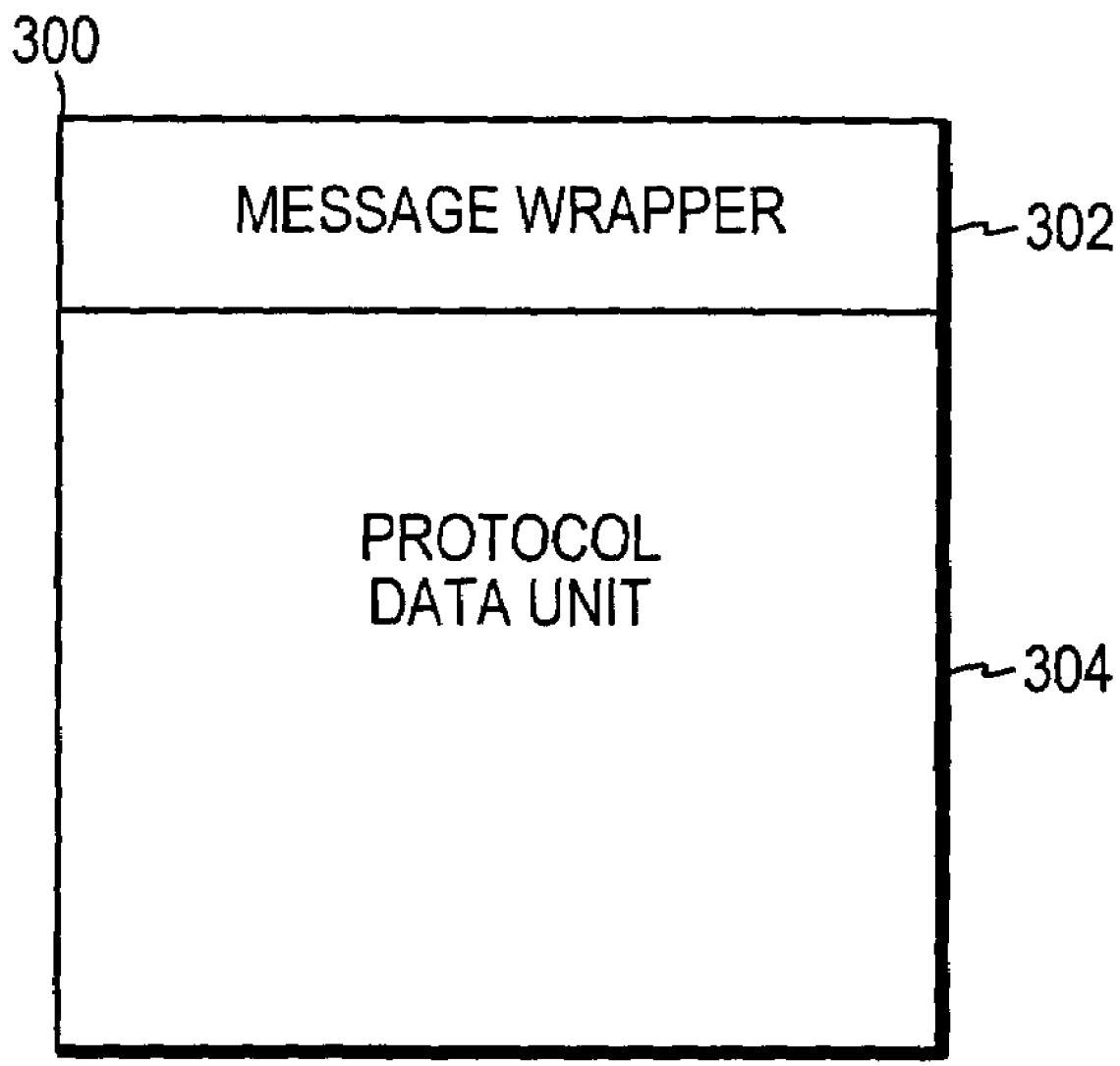
FIG. 3 shows the format of a Simple Network Management Protocol message.

FIG. 3 shows the format of the SNMP message 300 created in the SNMP layer 200 (FIG. 2). The SNMP message 300 includes a Protocol Data Unit ("PDU") 304 and a message wrapper 302. The PDU 304 includes the request for information from the managed object in a predefined format. The format of the PDU 304 is defined by the SNMP Structure of Management Information ("SMI"). The SMI also defines the language a MIB uses to describe managed objects. The format for the managed objects in the PDU 304 are constrained by the SMI. A standard MIB, such as the managed objects defined for the Asynchronous Transfer Mode ("ATM") in IETF RFC Number 1695 defines standard objects. A private MIB uses SMI to define proprietary managed objects. The managed objects shared by the management station 102 (FIG. 1) and the managed element 104 (FIG. 1) may be standard or proprietary objects.

The format of the SNMP message wrapper 302 is dependent on the version of SNMP implemented in the management station 102 (FIG. 1) and the managed element 104 (FIG. 1). There are currently three versions of SNMP: they are Version 1 ("SNMPv1"), Version 2 ("SNMPv2c") and Version 3 ("SNMPv3").

The message wrapper for SNMPv3 includes a user identification. The user identification in the SNMP message wrapper 302 may be used for user authentication by the managed element 104 (FIG. 1). The use of user identification for authentication in the message wrapper is described in IETF RFC Number 2274 published on the Internet in January 1998 and incorporated herein by reference. The user identification identifies the user of the network management application 106a-c (FIG. 2) in the management station 102 from which the SNMP message 300 is being sent. The user identification may be used in the managed element to identify the user and determine if the user has permission to access the information from the managed object that the user has requested.

SNMPv1 and SNMPv2c message wrappers 302 may include a community name. The use of a community name in the SNMP message wrapper 302 is described in the Internet Engineering Task Force ("IETF") Request For Comments ("RFC") 1902 published on the Internet in January 1996 and incorporated herein by reference. A community name may be assigned to each user or group of users of the management station and used for identification to determine if the user is allowed access to the information from a managed object stored in a managed element 104 (FIG. 2).

FIGS. 4A and 4B show a Local Configuration DataStore ("LCD") stored in the MIB 112 (FIG. 1) in the managed element 104 (FIG. 1). FIG. 4A shows an LCD for a managed element 104 (FIG. 1) supporting SNMPv3. FIG. 4B shows an LCD for a managed element 104 (FIG. 1) supporting SNMPv1 and SNMPv2c.

Referring to FIG. 4A, the LCD as shown includes three columns, a group identification column 404, a user identification column 406 and an assigned priority column 408. The group identification column 404 and the user identification column 406 provide support for authentication for SNMPv3 and are described in IETF RFC Number 2274. The assigned priority column 408 allows priority to be assigned to an SNMP message 300 dependent on the group number or user identification assigned to the SNMP message 300 by the management station 102 (FIG. 1). The user identification column 406 identifies the user sending the SNMP message 300 from the management station 102. Each user identification is assigned to a group identification and each group is assigned a priority. For example, as shown in the first row 400 of the configuration file, user #1 and user #4 are assigned to group #1 and are assigned a priority level 3.

FIG. 4B shows an LCD for a managed element 104 supporting SNMPv2c or SNMPv1. The LCD as shown includes two columns, a community identification column 410, and an assigned priority column 412. The community identification is used to identify users sending SNMP messages 300 from the management station 102. A user is assigned to a community identification and each community identification is assigned a priority. For example, in the first row 418, community identification #1 is assigned to user #1 and user #4 and is assigned a priority of 3.

Figure 5:
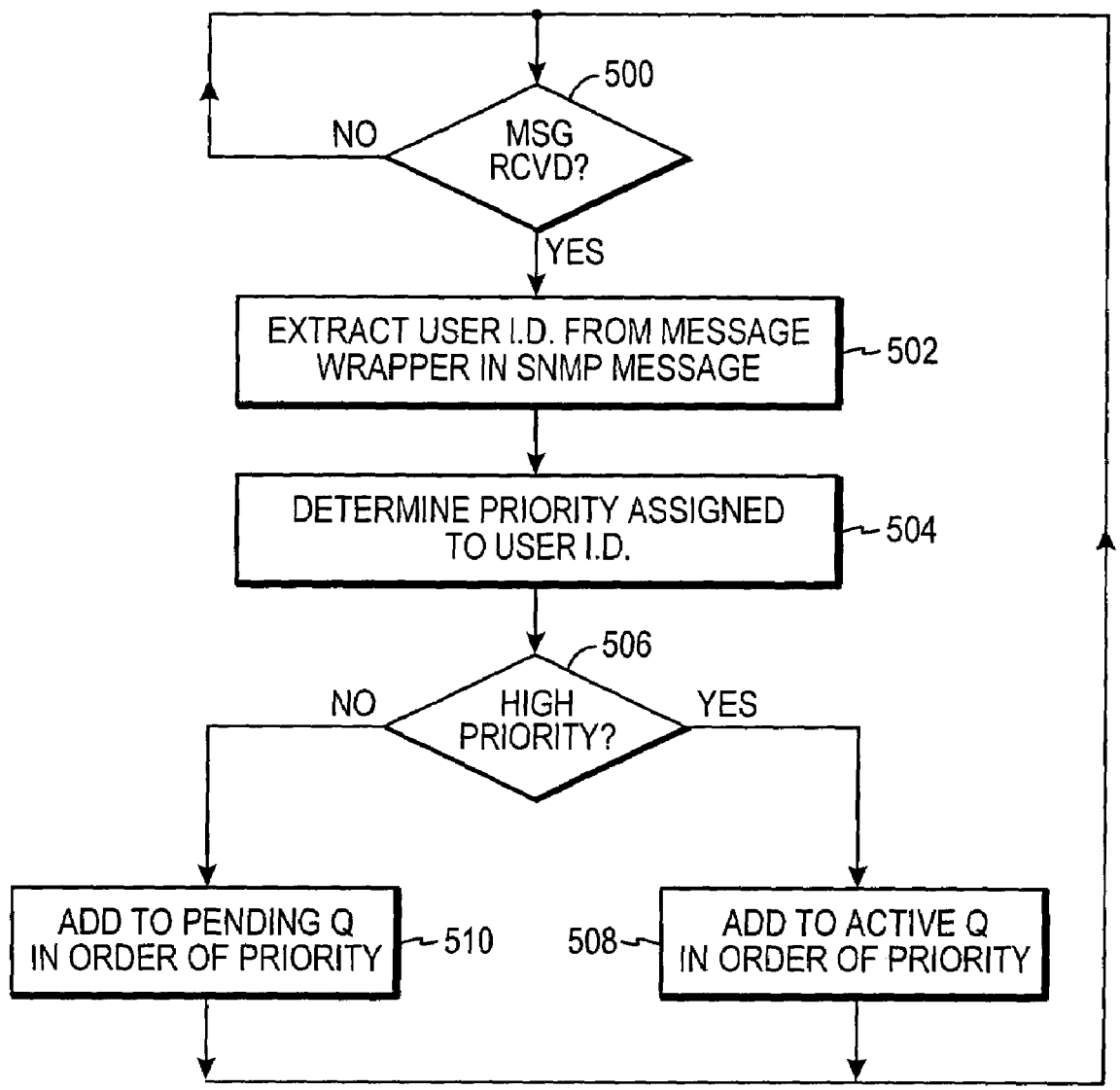
FIG. 5 is a flow diagram of a method implemented in the managed element shown in FIG. 1 for prioritizing network management requests from network management applications.

FIG. 5 shows the steps performed by the agent 110 (FIG. 1) in the managed element 104 (FIG. 1) upon receiving an SNMP message 300 from the management station 102 (FIG. 1).

In step 500 the agent 110 waits for an SNMP message 300 from the management station 102. After receiving an SNMP message 300, in step 502, the identification is extracted from the SNMP message wrapper 302 (FIG. 3). The identification in the message wrapper 302 may be a community identification, or a user identification or group identification, dependent on the version of SNMP implemented in the management station 102 (FIG. 1) and the managed element 104 (FIG. 1).

In step 504, using the identification extracted from the SNMP message 300 the agent determines the priority of the SNMP message 300 from the LCD (FIGS. 4A-4B) stored in the MIB 112 (FIG. 1). For example, if a SNMPv3 message is sent from user #2, the user identification in the SNMP message wrapper 302 is set to the identification for user #2. The agent 110 (FIG. 1) uses the identification for user #2 to determine the assigned priority, which is set to a priority value of '1' in column 408 (FIG. 4A) of the SNMPv3 LCD (FIG. 4A) stored in the MIB 112 (FIG. 1).

In step 506, the agent 110 (FIG. 1) determines the priority of the SNMP message 300 dependent on the identification extracted from the LCD. In step 510, if the priority of the network management request in the SNMP message 300 is lower than the network management requests included in the SNMP messages 300 currently being processed, the SNMP message 300 is added in order of priority to a pending SNMP message 300 queue (not shown), using any queuing algorithm known in the art.

In step 508, if the priority of the SNMP message 300 is higher than the priority of SNMP messages 300 on an active task queue (not shown) currently being processed by the agent 110 (FIG. 1), the agent 110 (FIG. 1) may determine that the SNMP message 300 is to be processed immediately. To immediately process the network management request included in the SNMP message 300, the SNMP message 300 is added to the front of the active task queue (not shown), using any queuing algorithm known in the art.

In an alternative embodiment, the priority of the SNMP message 300 may be added directly to the SNMP message 300 by the SNMP layer 200 (FIG. 1) in the management station 102 (FIG. 1). The priority of the SNMP message 300 may be added to the contents of the message wrapper 302 (FIG. 3) or the contents of the PDU 304 (FIG. 3). The priority added to the SNMP message wrapper 302 (FIG. 3) is dependent on the user identification from which the SNMP request message is being sent to the managed element 104 (FIG. 1). Adding priority to the SNMP message wrapper 302 (FIG. 3) or SNMP PDU 304 (FIG. 3) eliminates the need for priority columns 408, 412 in the LCD described in conjunction with FIGS. 4A and 4B.

Using this method a priority value is added to an SNMP message 300 in the SNMP layer 200 (FIG. 2) dependent on the user identification associated with user requesting information from a managed object stored in the managed element 104 (FIG. 1).

Figure 6:
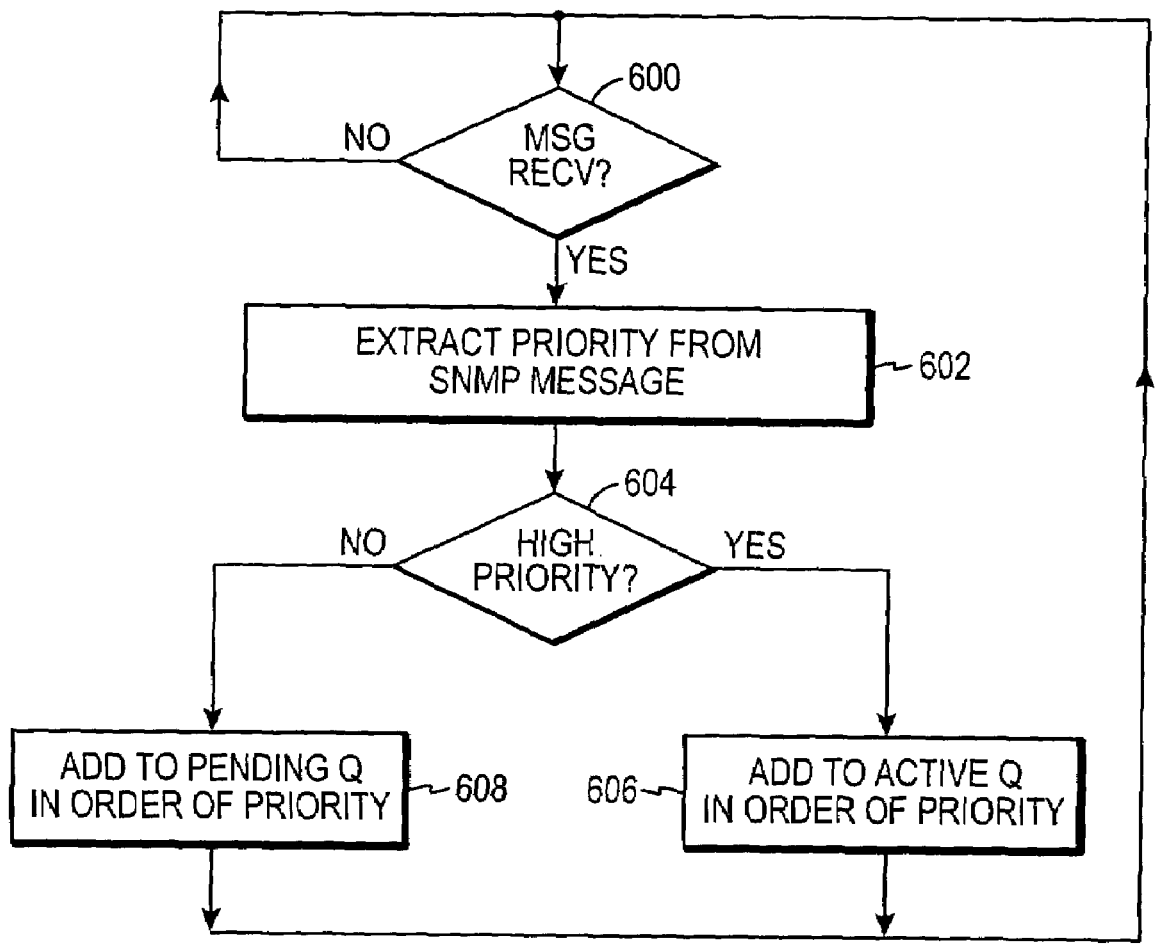
FIG. 6 is a flow diagram of another method implemented in the managed element shown in FIG. 1 for prioritizing network management requests from network management applications.

As shown in FIG. 6, in step 600 the agent 110 (FIG. 1) in the management station 104 receives an SNMP message 300. In step 602, the agent 110 (FIG. 1) extracts the priority of the SNMP message 300 from the SNMP message wrapper 302 (FIG. 3) or the SNMP message PDU (FIG. 3). In step 604, dependent on the priority of the SNMP message 300, the agent 110 (FIG. 1) determines whether the SNMP message 300 should be processed immediately.

In step 608, the agent 110 (FIG. 1) adds the SNMP message 300 to a pending task queue (not shown), to be processed whenever the managed element is not busy with tasks such as, data transfer or another SNMP message 300. The SNMP message 300 is added to the pending task queue (not shown) using any queuing algorithm known in the art.

In step 606, the agent 110 (FIG. 1) adds the SNMP message 300 to the active task queue (not shown), in order to process the SNMP message 300 immediately. The SNMP message 300 is added to the active task queue (not shown) using any queuing algorithm known in the art. If the priority of the SNMP message 300 is higher than other SNMP messages 300 or tasks on the active task queue, processing of the other tasks may be suspended in order to process the higher priority SNMP message 300 using techniques well-known in the art.

Adding a priority field to the contents of the network management request is not limited to SNMP. A priority field may also be added to network management requests in other network management protocols, such as DECnet, the Common Management Information Interface ("CMIP") and Common Object Request Broker Architecture/Internet Inter-Object Request Broker Protocol ("CORBA/IIOP").

FIG. 7 shows a portion of the contents of a configuration file for yet another embodiment for adding priority to network management requests from a management station 102 (FIG. 1) to a managed element 104 (FIG. 1). Using the configuration file, network management requests are prioritized dependent on a network source address assigned to a network management request. The source address column 702 includes the network source addresses assigned to a network management request by the network layers 204 shown in FIG. 2. The source address assigned is dependent on the network protocol implemented in the network layers 204 (FIG. 2). As discussed in conjunction with FIG. 2 the source address may be an IP address if IP is implemented in the network layers 204 (FIG. 2).

The configuration file is stored in the managed element's MIB 112 (FIG. 1). The source identification column 702 provides a list of the source addresses from which the managed element accepts network management requests. A priority is assigned to each of the accepted source address in the priority column 704. Upon receiving a network management request from a network management application 106*a*-*c* (FIG. 2) in a management station 102 (FIG. 2), the agent 110 (FIG. 1) in the managed element 104 (FIG. 2) extracts the source address from the network management request. The agent 110 (FIG. 1) uses the source address to obtain the priority associated with the source address from the configuration file.

The network management request is either placed at the front of the queue of active tasks (not shown), or placed on a pending task queue (not shown) dependent on the priority of the network management request. Using this method urgent network management requests are processed before low priority network management requests and other tasks.

This embodiment of the invention is applicable to any network management protocol such as, DECnet, the Common Management Information Interface ("CMIP") and Common Object Request Broker Architecture/Internet Inter-Object Request Broker Protocol ("CORBA/IIOP").

It will be apparent to those of ordinary skill in the art that methods involved in the present invention may be embodied in a computer program product that includes a computer usable medium. For example, such a computer usable medium can consist of a read only memory device, such as a hard drive device or a computer diskette, having computer readable program code stored thereon.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A computer readable storage medium containing instructions readable by a computer to configure the computer to prioritize a network management request sent by a management station to a managed element, comprising:
    a priority assignment routine which upon receiving a network management request assigns a priority value to the received network management request, the priority value assigned in the managed element dependent upon a source identifier in a network management header included in the request, the source identifier identifying the source of an application from which the request was sent; and
    a network management request routine which schedules the network management request in the managed element dependent on the assigned priority value.

2. The computer readable storage medium as claimed in claim 1 wherein the priority assignment routine further comprises:
    a priority value assignment routine which adds a priority value to a source identification in a source identification table.

3. The computer readable storage medium as claimed in claim 2 wherein the network management routine further comprises:
    a source identification extraction routine which extracts the source identification from the network management request; and
    a priority value determination routine which determines the priority value using the extracted source identification to index the source identification table.

4. A computer readable storage medium containing instructions readable by a computer to configure the computer to prioritize a network management request sent by a management station to a managed element, comprising:
    a priority assignment routine;
    a network management request scheduler;
    upon receiving a network management request, means, within the priority assignment routine, for assigning a priority value to the received network management request, the priority value assigned in the managed element dependent upon a source identifier in a network management wrapper included in the network management request, the source identifier identifying the source of an application from which the request was sent; and
    means, within the network management request scheduler, for scheduling the network management request in the managed element dependent on the assigned priority value.

5. The computer readable storage medium as claimed in claim 4 further comprising means, within the priority assignment routine, for adding a priority value to a source identification in a source identification table.

6. The computer readable storage medium as claimed in claim 5 further comprising means, within the network management request scheduler, for extracting the source identification from the network management request and means for determining the priority value using the extracted source identification to index the source identification table.

7. A computer program product for prioritizing a network management request sent by a management station to a managed element, the computer program product comprising a computer usable medium having computer readable code thereon, including program code which:
    upon receiving a network management request, assigns a priority value to the received network management request, the priority value assigned by the managed element dependent upon a source identifier in a network management header included in the request, the source identifier identifying the source of the application from which the request was sent; and
    schedules the network management request in the managed element dependent on the assigned priority value.

8. A computer program product as claimed in claim 7 further including program code which adds a priority value to a source identification in a source identification table.

9. A computer program product as claimed in claim 8 further including program code which extracts the source identification from the network management request and determines the priority value using the extracted source identification to index the source identification table.

10. A method for prioritizing a network management request sent by a management station to a managed element, comprising:
    upon receiving a network management request, assigning a priority value to the received network management request, the priority assigned by the managed element dependent upon a source identifier in a network management wrapper included in the request, the source identifier identifying the source of an application from which the request was sent; and scheduling the network management request by the managed element dependent on the assigned priority value, including extracting the source identifier from the network management request and determining the priority value by using the extracted source identifier to index a source identification table.

11. The method as claimed in claim 10 wherein scheduling further comprises selecting the order of execution of the network management request dependent on the determined priority value.

12. The method as claimed in claim 11 wherein selecting further comprises preempting the currently executing task if the determined value for the management request is higher than the currently executing task.

13. The method as claimed in claim 11 wherein selecting further comprises adding the management request to the end of a request queue if the determined priority is lower than the priority of the tasks in the request queue.

14. The method as claimed in claim 11 wherein selecting further comprises adding the management request to the front of a request queue if the determined priority is higher than the priority of the tasks in the request queue.

* * * * *